United States Patent
Zhang (10) Patent No.: US 9,858,117 B2
(45) Date of Patent: Jan. 2, 2018

(54) METHOD AND SYSTEM FOR SCHEDULING INPUT/OUTPUT RESOURCES OF A VIRTUAL MACHINE

(71) Applicant: Alibaba Group Holding Limited, George Town, Grand Cayman (KY)

(72) Inventor: Chao Zhang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 15/087,396

(22) Filed: Mar. 31, 2016

(65) Prior Publication Data

US 2016/0314017 A1 Oct. 27, 2016

(30) Foreign Application Priority Data

Apr. 23, 2015 (CN) .......................... 2015 1 0197899

(51) Int. Cl.
- *G06F 9/455* (2006.01)
- *G06F 9/48* (2006.01)
- *G06F 9/50* (2006.01)
- *G06F 13/10* (2006.01)

(52) U.S. Cl.
CPC ........ *G06F 9/4881* (2013.01); *G06F 9/45533* (2013.01); *G06F 9/45558* (2013.01); *G06F 9/5011* (2013.01); *G06F 13/102* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2005/0257222 A1 | 11/2005 | Davis et al. | |
| 2008/0216086 A1* | 9/2008 | Tanaka | G06F 3/061 718/105 |
| 2008/0288661 A1 | 11/2008 | Galles | |
| 2009/0144731 A1* | 6/2009 | Brown | G06F 13/102 718/1 |
| 2009/0307396 A1 | 12/2009 | Nogueras et al. | |
| 2011/0106802 A1* | 5/2011 | Pinkney | G06F 17/30085 707/737 |
| 2011/0296488 A1 | 12/2011 | Dandekar et al. | |
| 2012/0084262 A1* | 4/2012 | Dwarampudi | G06F 11/1448 707/667 |
| 2012/0221611 A1* | 8/2012 | Watanabe | G06F 3/0608 707/827 |
| 2012/0239896 A1* | 9/2012 | Sobel | G06F 3/0608 711/165 |
| 2015/0169341 A1* | 6/2015 | Gulati | G06F 9/45533 718/1 |

* cited by examiner

*Primary Examiner* — Dong Kim
(74) *Attorney, Agent, or Firm* — Shun Yao; Park, Vaughan, Fleming & Dowler LLP (57) ABSTRACT

One embodiment provides a system for scheduling I/O resources of a virtual machine. During operation, in response to receiving a plurality of I/O requests, the system identifies a plurality of target virtual disks to which the I/O requests are to be sent, wherein a virtual disk corresponds to a previously created I/O queue. The system assigns a respective I/O request to the corresponding I/O queue for an identified target virtual disk. The system schedules I/O resources to be used by the respective I/O request based on a scheduling parameter that corresponds to the identified target virtual disk.

20 Claims, 7 Drawing Sheets

| | Virtual Disk Identifier 252 | I/O Queue 254 |
|---|---|---|
| TABLE 250 | | |
| ENTRY 256 | fd1 | CFQ Queue 206.1 |
| ENTRY 258 | fd2 | CFQ Queue 208.2 |
| | ... | ... |

METHOD AND SYSTEM FOR SCHEDULING INPUT/OUTPUT RESOURCES OF A VIRTUAL MACHINE

RELATED APPLICATION

Under 35 U.S.C. 119, this application claims the benefit and right of priority of Chinese Patent Application No. 201510197899.5, filed 23 Apr. 2015.

BACKGROUND

Field

This disclosure is generally related to cloud computing technology. More specifically, this disclosure is related to a method and system for scheduling input/output resources of a virtual machine.

Related Art

In computing, virtualization is a technology for managing computer resources by abstracting various physical resources (such as operating systems, servers, networks, and storage devices) as logical resources. Virtualization provides a way to use the physical resources without being tied to the original configuration and location of the physical resources. Virtualization may include the creation of a virtual machine that acts like a real computer with an operating system, and software executed on these virtual machines is separated from the underlying hardware resources. Virtualization also enables cloud computing, which is an internet-based computing that provides shared processing resources and data to computers and other devices on demand.

Storage properties play an essential role in virtualization and cloud computing. For example, a Kernel-based Virtual Machine (KVM) is a virtualization technology for the Linux kernel in which a plurality of operating systems can be run on one physical entity. In KVM storage virtualization, multiple virtual disks may be used to share one input/output (I/O) thread. These multiple virtual disks that share one I/O thread may also share the same I/O queue. When one of these virtual disks requires or consumes more I/O resources, the other virtual disks which share the same I/O thread have access to a decreased amount of resources. This may result in an imbalance in the use and availability of I/O resources among the multiple virtual disks. Furthermore, an I/O operation corresponding to a virtual disk may be an interactive operation performed by a user. An imbalance in the availability of I/O resources may also impact the user's experience.

SUMMARY

One embodiment provides a system for scheduling I/O resources of a virtual machine. During operation, in response to receiving a plurality of I/O requests, the system identifies a plurality of target virtual disks to which the I/O requests are to be sent, wherein a virtual disk corresponds to a previously created I/O queue. The system assigns a respective I/O request to the corresponding I/O queue for an identified target virtual disk. The system schedules I/O resources to be used by the respective I/O request based on a scheduling parameter that corresponds to the identified target virtual disk.

In some embodiments, the system creates an I/O queue for each of a plurality of virtual disks of a virtual machine, wherein the plurality of virtual disks includes the plurality of target virtual disks, and wherein the virtual machine is associated with the computer system.

In some embodiments, in response to receiving the plurality of I/O requests, the system initiates I/O operations for the plurality of virtual disks.

In some embodiments, the system obtains an I/O feature for the respective I/O request, wherein the I/O feature includes a virtual disk identifier and one or more of: a process identifier which indicates that a source of the respective I/O request is a virtual machine; and an indicator of a priority or a strategy.

In some embodiments, in response to determining that the respective I/O request includes the process identifier, the system identifies a virtual disk that corresponds to the virtual disk identifier and is a virtual disk to be accessed by the respective I/O request.

In some embodiments, the system identifies the target virtual disk based on the virtual disk identifier included in the I/O feature of the respective I/O request. The system identifies the target I/O queue corresponding to the respective I/O request based on a mapping between the previously created I/O queue and the target virtual disk.

In some embodiments, the system obtains, for each virtual disk of the virtual machine, the scheduling parameter that corresponds to a respective virtual disk, wherein the scheduling parameter represents an I/O resources quota for the respective virtual disk, wherein the I/O resources quota indicates an allotted percentage of shared I/O resources for the virtual disks. The system allocates to each I/O request an amount of the shared I/O resources based on the allotted percentage indicated as the I/O resources quota for the respective virtual disk.

In some embodiments, in response to determining that the I/O resources quota for the respective virtual disk is greater than a predetermined threshold and that the respective virtual disk is not idle, the system allocates to each I/O request an amount of the shared I/O resources based on the allotted percentage of the I/O resources quota for the respective virtual disk.

In some embodiments, in response to determining that the I/O resources quota for the respective virtual disk is greater than a predetermined threshold and that the respective virtual disk is idle, the system performs the following operations: updates the I/O resources quota for the respective virtual disk; and allocates to each I/O request an amount of the shared I/O resources based on the updated percentage of the I/O resources quota for the respective virtual disk.

In some embodiments, the system reduces by an amount the I/O resources quota for the respective virtual disk that is idle, and increases by the amount the I/O resources quota for other virtual disks that are not idle.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of inefficiencies and imbalances resulting from multiple virtual disks sharing one I/O thread by providing a method for scheduling I/O resources of a virtual machine. For example, in the virtualization of storage for a KVM, multiple disks may be used to share a single I/O thread, where the thread corresponds to a single I/O queue. When one of these virtual disks requires or consumes more I/O resources, the other virtual disks which share the same I/O thread may experience a decreased amount of the I/O resources. This may result in an imbalance in the use and availability of I/O resources among the multiple virtual disks. Furthermore, an I/O operation corresponding to a virtual disk may be an interactive operation performed by a user. An imbalance in the availability of I/O resources may also impact the user's experience.

Embodiments of the present invention solve this problem by providing a system which allows I/O requests to be passed to the physical machine via a passage between the virtual machine and the physical machine (e.g., the data platform I/O). The system creates, in the kernel of the physical machine, an I/O queue for each virtual disk of the virtual machine. Each I/O queue corresponds to a subsequently received I/O request which is triggered by a user of the physical machine. For example, when an I/O request is involved in a read-write operation associated with a virtual disk, the system will assign the I/O request to the I/O queue that corresponds to the virtual disk. This allows the system to schedule the I/O resources based on the I/O resources quota corresponding to each virtual disk (i.e., each I/O queue). Thus, the system can balance and allocate the I/O resources among the multiple virtual disks of the virtual machine, which results in an improved Quality of Service (QoS) for the virtual machine.

In addition, the system can configure different virtual machines with different I/O priorities, which allows the system to schedule the I/O resources based on both the I/O priorities and the I/O resources quota. This allows the multiple virtual disks of the virtual machine to remain isolated from each other, which also results in improved QoS control.

Exemplary Network and Environment

Figure 1:
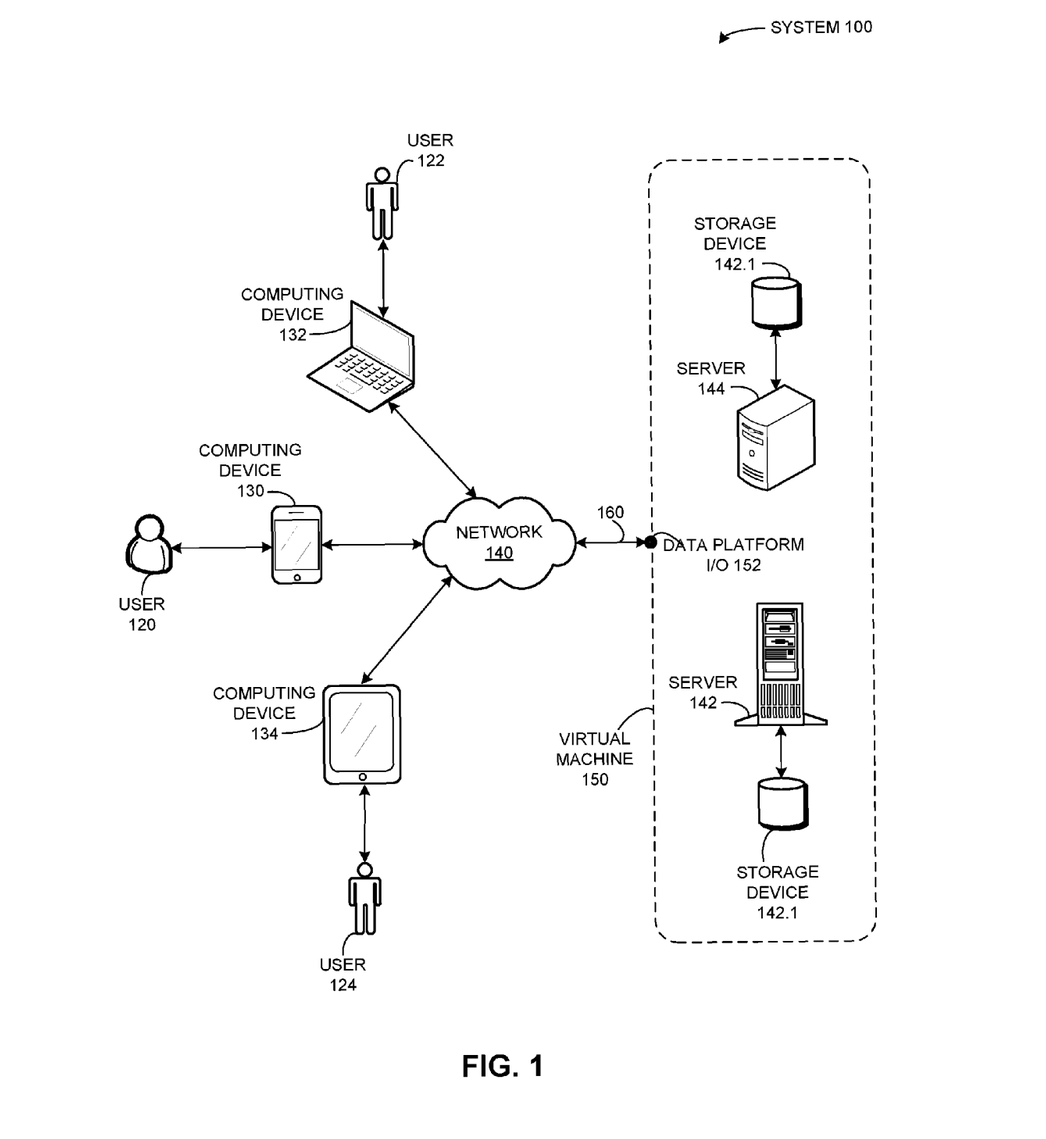
FIG. 1 illustrates an exemplary computing system that facilitates scheduling of I/O resources of a virtual machine, in accordance with an embodiment of the present application.

FIG. 1 illustrates an exemplary computing system that facilitates scheduling of I/O resources of a virtual machine, in accordance with an embodiment of the present application. In this example, system 100 can include computing devices 130, 132, and 134, which are associated with users 120, 122, and 124, respectively. Computing devices 130-134 can include, for example, a tablet, a mobile phone, an electronic reader, a laptop computer, a desktop computer, or any other computing device. Computing devices 130-134 can communicate with servers 142 and 144 via a network 140. Server 142 can communicate with a storage device 142.1, and server 144 can communicate with a storage device 144.1. In some embodiments, storage devices 142.1 and 144.1 reside, respectively, on servers 142 and 144. Based on virtualization technology, physical servers 142 and 144 (along with storage devices 142.1 and 144.1) may be presented as a single virtual machine 150, such that computing devices 130-134 can communicate with virtual machine 150 as a single entity (e.g., via a flow 160 and a data platform I/O 152 passage).

Figure 2A:
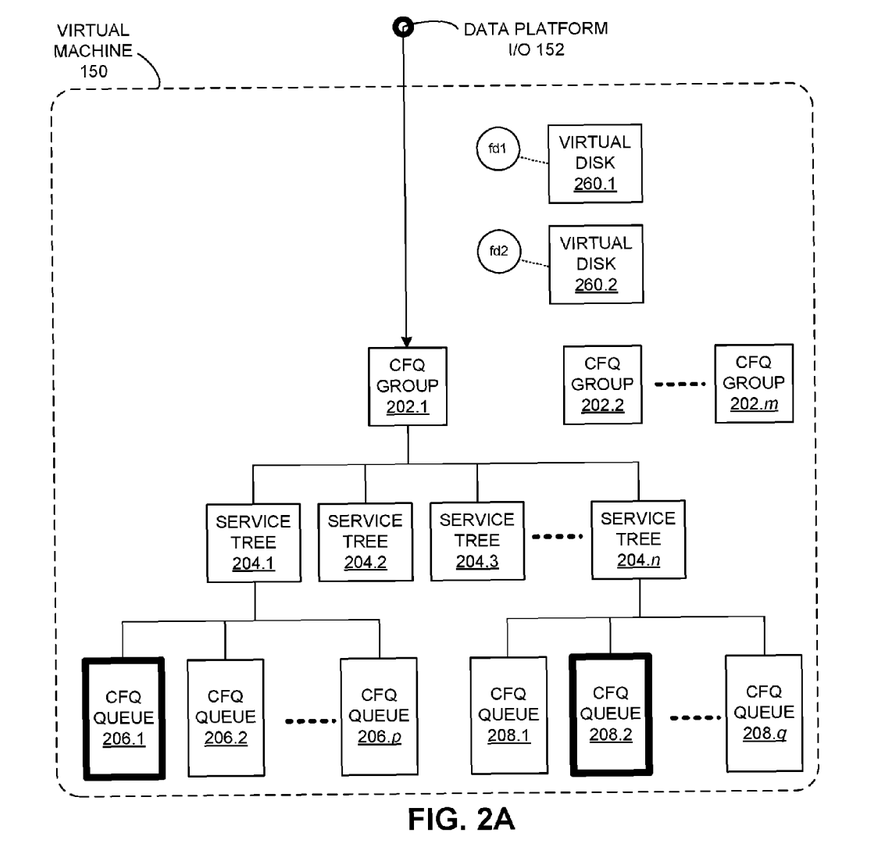
FIG. 2A illustrates an exemplary system that facilitates scheduling of I/O resources of a virtual machine, including an illustration of the relationship between the virtual disks and elements used in a CFQ scheduling algorithm, in accordance with an embodiment of the present application.

FIG. 2A illustrates an exemplary system that facilitates scheduling of I/O resources of a virtual machine 150, including an illustration of the relationship between the virtual disks and elements used in a CFQ scheduling algorithm, in accordance with an embodiment of the present application. During operation, the system can create, in a kernel of the physical computing device, an I/O queue for each virtual disk of a virtual machine (e.g., virtual disks 260.1 and 260.2 of virtual machine 150). A user of the system (e.g., a virtual machine installed with a Linux system) may trigger I/O operations by sending I/O requests, such as a request to read data from a hard disk or a request for a server to validate authentication information. The system can receive the I/O requests via data platform I/O 152. The I/O requests can indicate an I/O feature, which can include a virtual disk identifier. The system can identify the target virtual disks to which the I/O requests are to be sent. The system can assign an I/O request to the corresponding I/O queue for the target virtual disk, and can subsequently schedule the I/O resources to be used by the I/O requests based on scheduling parameters that correspond to each virtual disk.

Based on the Completely Fair Queueing (CFG) scheduling algorithm, the system can implement three layers in order to schedule the I/O requests: CFQ groups; service trees; and CFQ queues. Each CFQ group corresponds to an I/O strategy group. The system will allocate certain I/O resources to each I/O strategy group, and a CFQ group can include a plurality of service trees, which can in turn include a plurality of CFQ queues. For example, in FIG. 2, the system for virtual machine 150 includes virtual disks 260.1 and 260.1, with virtual disk identifiers 261.1 and 262.1 that have a value, respectively, of "fd1" and "fd2." Based on the CFQ scheduling algorithm, the system may include CFQ groups 202.1-202.m, each of which corresponds to an I/O strategy group. CFQ group 202.1 can include service trees 204.1-204.n. Service tree 204.1 can include CFQ queues 206.1-206.p, and service tree 204.n can include CFQ queues 208.1-208.q.

Figure 2B:
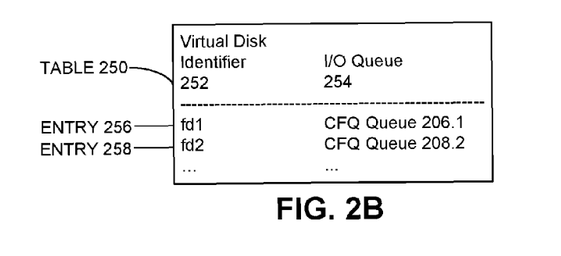
FIG. 2B illustrates an exemplary table depicting a mapping between a virtual disk identifier and a CFQ queue, corresponding to FIG. 2A, in accordance with an embodiment of the present application.

FIG. 2B illustrates an exemplary table 250 depicting a mapping between a virtual disk identifier and a CFQ queue, corresponding to FIG. 2A, in accordance with an embodiment of the present application. Table 250 can include entries that indicate a virtual disk identifier 252 and a corresponding I/O queue 254. For example, table 250 can include an entry 256 that indicates a virtual disk identifier with a value of "fd1" and an I/O queue of "CFQ Queue 206.1." Table 250 can also include an entry 258 that indicates a virtual disk identifier with a value of "fd2" and an I/O queue of "CFQ Queue 208.2."

Thus, virtual disk 260.1 with a virtual disk identifier of "fd1" corresponds to CFQ Queue 206.1 (as outlined in bold in FIG. 2A), and virtual disk 260.2 with a virtual disk identifier of "fd2" corresponds to CFQ Queue 208.2 (as outlined in bold in FIG. 2A). As a result of the mapping created in, e.g., table 250, when the system receives an I/O request which indicates a virtual disk identifier, the system can identify the target virtual disk to which the I/O request is to be sent (as described further below in relation to FIG. 4) and can also assign the I/O request to the corresponding I/O queue for the target virtual disk (as described further below in relation to FIG. 5).

Upon performing these steps, the system can schedule the I/O resources to be used by the I/O requests based on scheduling parameters that correspond to each virtual disk, which facilitates the fair scheduling of the I/O resources of the virtual machine.

Method for Scheduling I/O Resources of a Virtual Machine

Figure 3:
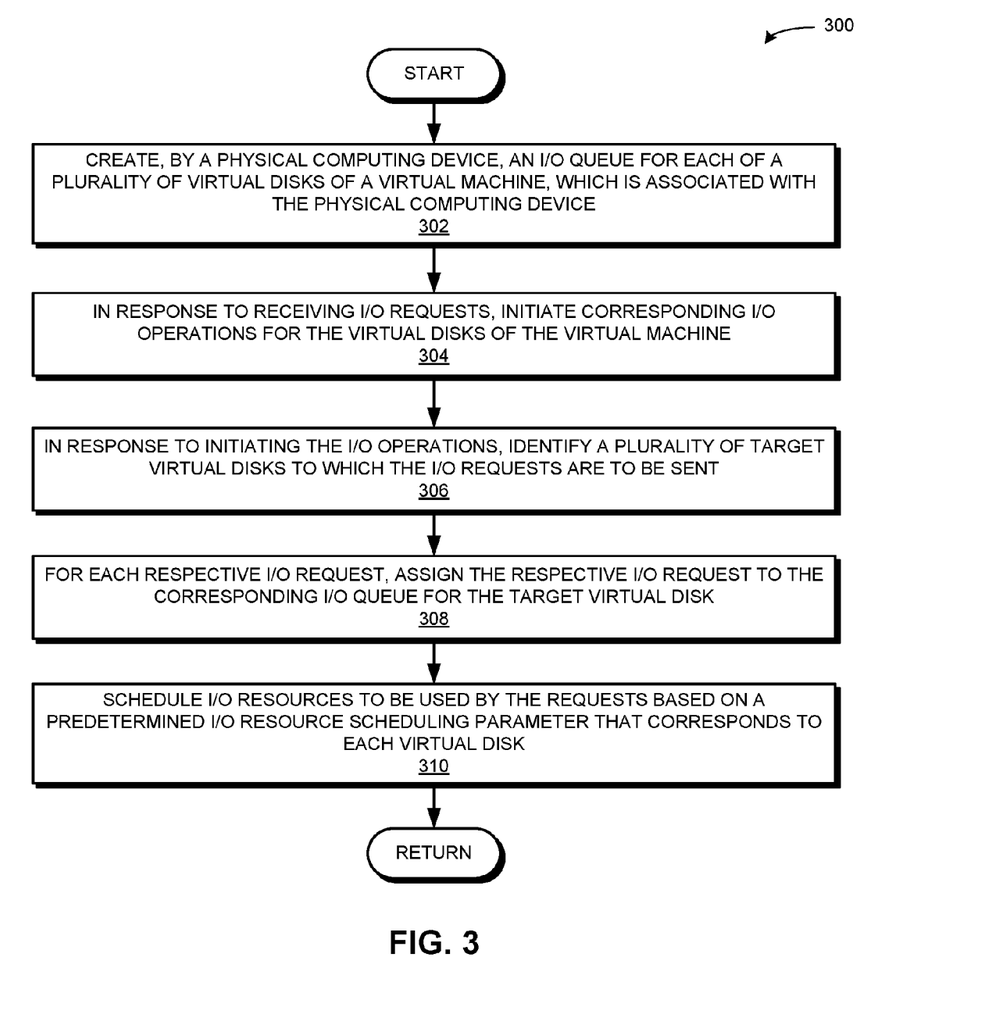
FIG. 3 presents a flowchart illustrating a method by a physical computing device for facilitating scheduling of I/O resources of a virtual machine, in accordance with an embodiment of the present application.

FIG. 3 presents a flowchart 300 illustrating a method by a physical computing device for facilitating scheduling of I/O resources of a virtual machine, in accordance with an embodiment of the present application. During operation, the system creates, by a physical computing device, an I/O queue for each of a plurality of virtual disks of a virtual machine, which is represented by the physical computing device (operation 302, as described above in relation to FIG. 2A). In response to receiving I/O requests, the system initiates corresponding I/O operations for the virtual disks of the virtual machine (operation 304). The I/O requests may be received from a user of the physical computing device or from a user of the virtual machine represented by the physical computing device. The I/O requests may also be received from a user of another physical computing device or virtual machine which interacts with the physical computing device or the virtual machine associated with the physical computing device.

In response to initiating the I/O operations (e.g., receiving the I/O requests), the system identifies a plurality of target virtual disks to which the I/O requests are to be sent (operation 306). The specific operations involved in operation 306 are described below in relation to FIG. 4. For each respective I/O request, the system assigns the respective I/O request to the corresponding I/O queue for the target virtual disk (operation 308). The specific operations involved in operation 308 are described below in relation to FIG. 5. Subsequently, the system can schedule I/O resources to be used by the requested based on a predetermined I/O resource scheduling parameter that corresponds to each virtual disk (operation 310). The specific operations involved in operation 310 are described below in relation to FIG. 6.

Identifying a Plurality of Virtual Disks to which I/O Requests are to Sent

Figure 4:
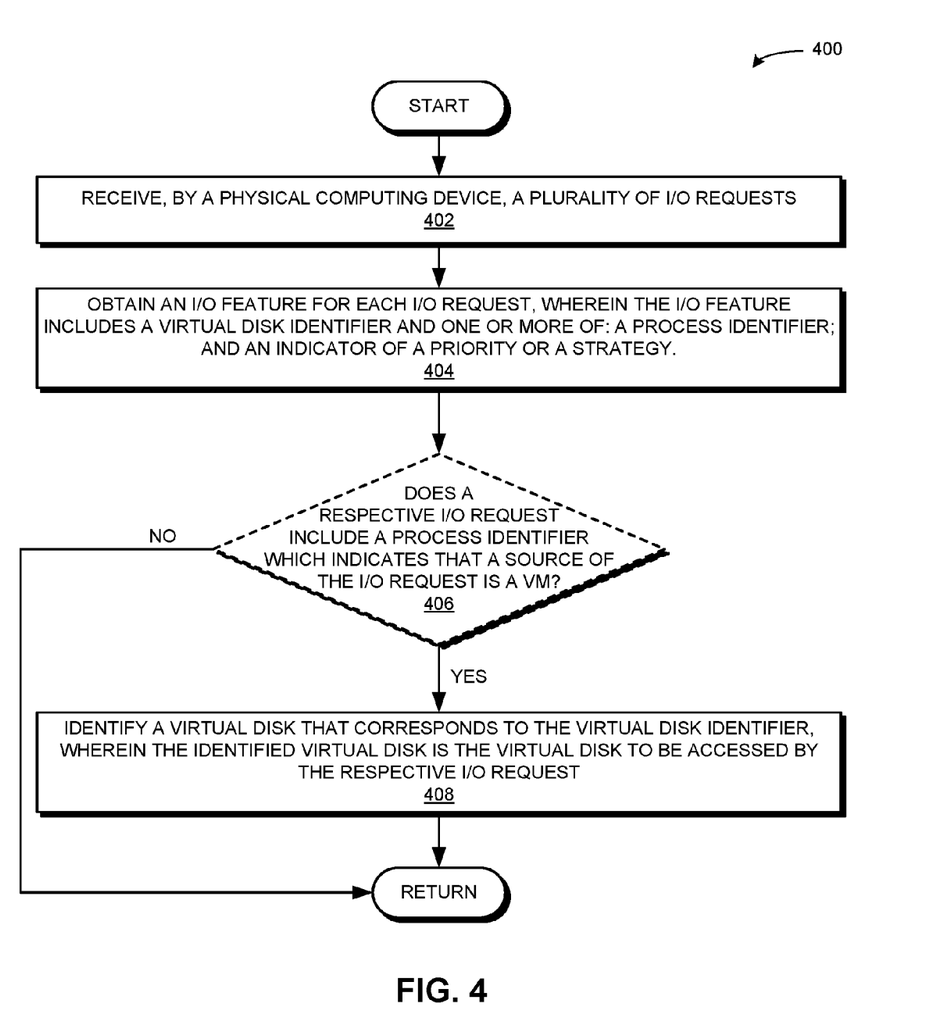
FIG. 4 presents a flowchart illustrating a method by a physical computing device for facilitating scheduling of I/O resources of a virtual machine, including identifying a plurality of virtual disks to which I/O requests are to be sent, in accordance with an embodiment of the present application.

FIG. 4 presents a flowchart 400 illustrating a method by a physical computing device for facilitating scheduling of I/O resources of a virtual machine, including identifying a plurality of virtual disks to which I/O requests are to be sent, in accordance with an embodiment of the present application. During operation, the system receives a plurality of I/O requests (from users of a physical computing device or users of a virtual machine associated with the physical computing device) (operation 402). The system obtains an I/O feature for each I/O request, where the I/O feature includes a virtual disk identifier (operation 404). The virtual disk identifier included in the I/O feature is used to represent or identify the virtual disk to be accessed by the I/O request. The I/O feature can be preset by the user or the system or be of a predetermined value. If the predetermined I/O feature includes an identifier for a specific virtual disk, it may imply that the user is more interested in read-write operations with respect to the virtual disk. For example, a virtual disk may correspond to a file in the physical machine, and the virtual disk identifier may be a file describer or a file identifier. Other symbols may be used to represent organizational or logical units of the physical machine.

If the user has preset the I/O feature (e.g., by indicating a virtual identifier of "fd1" for virtual disk 260.1), then the system may mark the I/O request based on whether the read-write operation involved in the I/O request is associated with the virtual disk identifier. Thus, the virtual disk to which the read-write operation of an individual I/O request is directed may be identified based on the I/O feature of the individual I/O request.

The I/O feature can also include a process identifier, which can indicate whether a trigger source of an I/O request is a virtual machine or a physical machine. In some embodiments, the operations described in FIG. 4 for identifying the plurality of virtual disks to which I/O requests are to be sent may proceed only if the I/O requests are transmitted from a source that is a virtual machine. The system can determine whether a respective I/O request includes a process identifier which indicates that a source of the I/O request is a virtual machine (decision 406). If it does not, the operation returns. If it does, the system identifies a virtual disk that corresponds to the virtual disk identifier included in the I/O feature (operation 408). The identified virtual disk is the virtual disk to be accessed by the respective I/O request.

Figure 5:
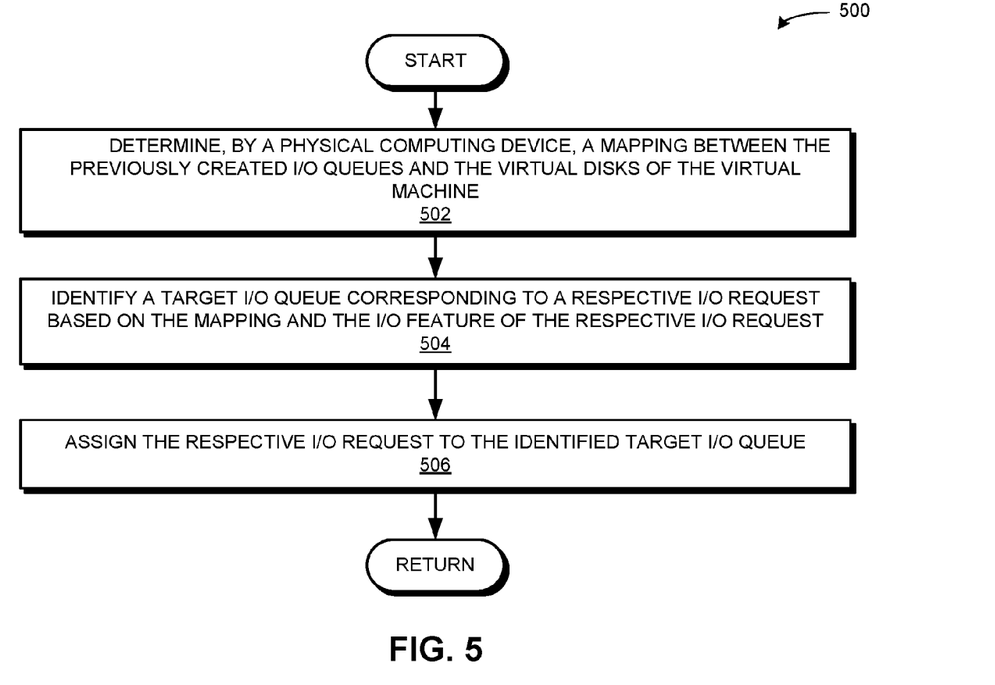
FIG. 5 presents a flowchart illustrating a method by a physical computing device for facilitating scheduling of I/O resources of a virtual machine, including assigning an I/O request to a corresponding I/O queue for a target virtual disk, in accordance with an embodiment of the present application.

Assigning an I/O Request to the Corresponding I/O Queue for the Target Virtual Disk FIG. 5 presents a flowchart 500 illustrating a method by a physical computing device for facilitating scheduling of I/O resources of a virtual machine, including assigning an I/O request to a corresponding I/O queue for a target virtual disk, in accordance with an embodiment of the present application. During operation, the system determines, by a physical computing device, a mapping between the previously created I/O queues and the virtual disks of the virtual machine (operation 502). For example, the system can obtain the mapping between the virtual disk 260.1 and the corresponding I/O queue 206.1 based on entry 256 of table 250, which indicates a mapping between the virtual disk identifier of "fd1" of virtual disk 260.1 and the corresponding I/O queue of "CFQ Queue 206.1."

For each I/O request, the system can identify a target I/O queue corresponding to a respective I/O request based on the mapping and the I/O feature of the respective I/O request (operation 504). Specifically, the system can identify the target virtual disk based on the virtual disk identifier included in the I/O feature of the I/O request, and can subsequently identify the target I/O queue corresponding to the I/O request based on the mapping between the virtual disks and the I/O queues. For example, for an I/O request that indicates an I/O feature with a virtual disk identifier "fd1," the system can identify virtual disk 260.1 as the target virtual disk. The system can subsequently identify, e.g., from entry 256 of table 250, CFQ Queue 206.1 as the target I/O queue corresponding to the I/O request. Finally, the system can assign, for each I/O request, the respective I/O request to the corresponding identified target I/O queue (operation 506).

Scheduling I/O Resources Based on I/O Resource Scheduling Parameters

Figure 6:
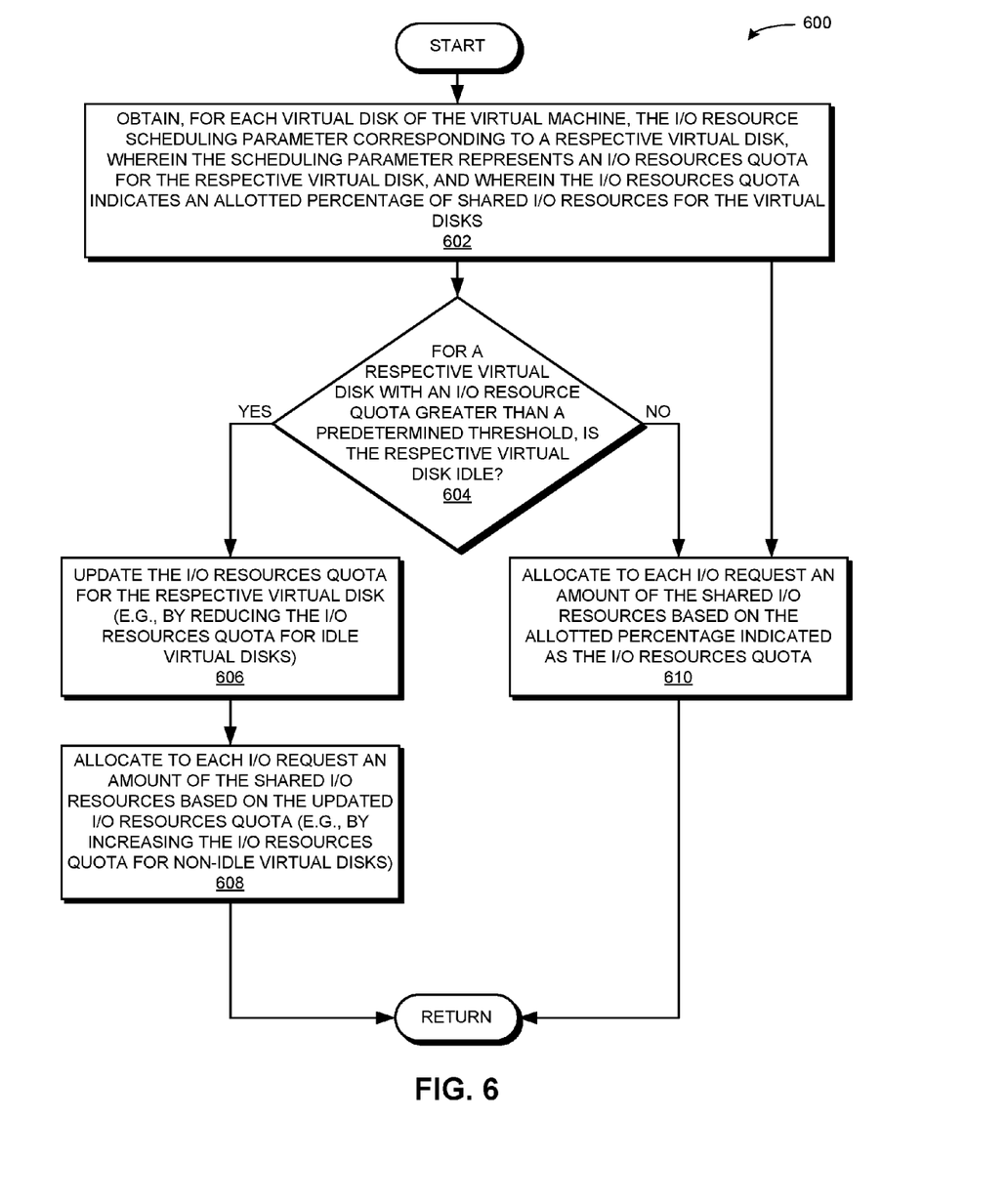
FIG. 6 presents a flowchart illustrating a method by a physical computing device for facilitating scheduling of I/O resources of a virtual machine, where the scheduling is based on a predetermined I/O resource scheduling parameter that corresponds to each virtual disk, in accordance with an embodiment of the present application.

FIG. 6 presents a flowchart illustrating a method by a physical computing device for facilitating scheduling of I/O resources of a virtual machine, where the scheduling is based on a predetermined I/O resource scheduling parameter that corresponds to each virtual disk, in accordance with an embodiment of the present application. During operation, the system obtains, for each virtual disk of the virtual machine, the I/O resource scheduling parameter corresponding to a respective virtual disk, wherein the scheduling parameter represents an I/O resources quota for the respective disk (operation 602). The I/O resources quota indicates an allotted percentage of shared I/O resources for the virtual disks. For example, in FIG. 2, virtual disks 260.1 and 260.2 may share I/O resources in a predetermined proportion, such that a 1:3 ratio for virtual disk 260.1 to virtual disk 260.2 for a bandwidth of 100 M results in a 25 M bandwidth allotment to virtual disk 260.1 and a 75 M bandwidth allotment to virtual disk 260.2 (i.e., 25% and 75%, respectively). The system can allocate to each I/O request an amount of the shared I/O resources based on the allotted percentage indicated as the I/O resources quota (operation 610).

The system can also set a predetermined threshold which indicates a percentage above which an idle virtual disk with a greater 110 resources quota than the predetermined threshold will cause a reallocation of the I/O resources quota for the virtual disks of the virtual machine. The system determines, for a respective virtual disk with an I/O resources quota greater than a predetermined threshold, whether the respective virtual disk is idle (decision 604). In the above example, where virtual disk 260.1 has an allotment of 25% and virtual disk 260.2 has an allotment of 75%, if the predetermined threshold for the system is set to 50%, the system will determine whether a respective virtual disk (e.g., virtual disk 260.2) is idle or not.

If the respective virtual disk with an I/O resources quota greater than the predetermined threshold is not idle, the system will allocate to each I/O request an amount of the shared I/O resources based on the allotted percentage indicated as the I/O resources quota (operation 610). In the above example, the shared I/O resources will be allocated such that I/O requests assigned to queues associated with virtual disk 260.1 receive 25% of the shared I/O resources, and I/O requests assigned to queues associated with virtual disk 260.2 receive 75% of the shared I/O resources.

If the respective virtual disk with the I/O resources quota greater than the predetermined threshold is idle (decision 604), the system updates the I/O resources quota for the respective virtual disk (e.g., by reducing by an amount the I/O resources quota for idle virtual disks) (operation 606). The system can subsequently allocate to each I/O request an amount of the shared I/O resources based on the updated percentage of the I/O resources quota (e.g., by increasing by the amount the I/O resources quota for other non-idle virtual disks) (operation 608). In the example above, the system can adjust or update the I/O resources quota for virtual disk 2 to from 75% to 25%, and can also adjust or update the I/O resources quota for virtual disk 1 from 25% to 75%. In operations 606 and 608, the system can reallocate the I/O resources (e.g., determine the amount by which to reduce and increase the I/O resources quota for the virtual disks) based on the predetermined threshold or on any method and in any proportion based on other scheduling strategy considerations or parameters.

Exemplary Computer System

Figure 7:
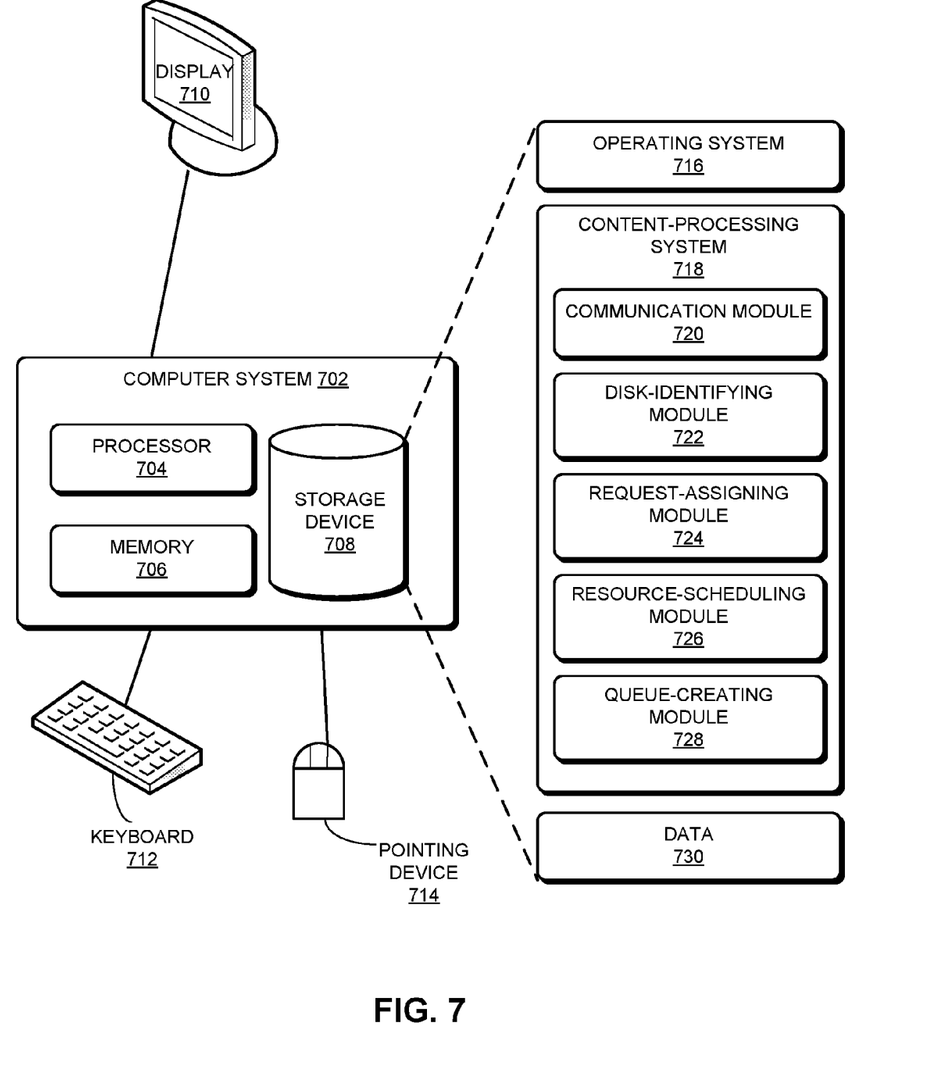
FIG. 7 illustrates an exemplary computer system that facilitates scheduling of I/O resources of a virtual machine, in accordance with an embodiment of the present application.

FIG. 7 illustrates an exemplary computer system that facilitates scheduling of I/O resources of a virtual machine, in accordance with an embodiment of the present application. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network, where a data packet can correspond to an I/O request. Content-processing system 718 can also include instructions for, in response to receiving a plurality of I/O requests, identifying a plurality of target virtual disks to which the I/O requests are to be sent, wherein a virtual disk corresponds to a previously created I/O queue (disk-identifying module 722). Content-processing system 718 can include instructions for assigning a respective I/O request to the corresponding I/O queue for an identified target virtual disk (request-assigning module 724). Content-processing system 718 can further include instructions for scheduling I/O resources to be used by the respective I/O request based on a scheduling parameter that corresponds to the identified target virtual disk (resource-scheduling module 726). Content-processing system 718 can include instructions for creating an I/O queue for each of a plurality of virtual disks of a virtual machine (queue-creating module 728).

Content-processing system 718 can also include instructions for, in response to receiving the plurality of I/O requests, initiating I/O operations for the plurality of virtual disks (disk-identifying module 722). Content-processing system 718 can include instructions for obtaining an I/O feature for the respective I/O request (disk-identifying module 722). Content-processing system 718 can further include instructions for, in response to determining that the respective I/O request includes the process identifier, identifying a virtual disk that corresponds to the virtual disk identifier and is a virtual disk to be accessed by the respective I/O request (disk-identifying module 722). Content-processing system 718 can include instructions for identifying the target virtual disk based on the virtual disk identifier included in the I/O feature of the respective I/O request, and identifying the target I/O queue corresponding to the respective I/O request based on a mapping between the previously created I/O queue and the target virtual disk (disk-identifying module 722).

Content-processing system 718 can additionally include instructions for obtaining, for each virtual disk of the virtual machine, the scheduling parameter that corresponds to a respective virtual disk (resource-scheduling module 726). Content-processing system 718 can include instructions for allocating to each I/O request an amount of the shared I/O resources based on the allotted percentage indicated as the I/O resources quota for the respective virtual disk (resource-scheduling module 726).

Content-processing system 718 can include instructions for, in response to determining that the I/O resources quota for the respective virtual disk is greater than a predetermined threshold and that the respective virtual disk is not idle, the system allocating to each I/O request an amount of the shared I/O resources based on the allotted percentage of the I/O resources quota for the respective virtual disk (resource-scheduling module 726). Furthermore, content-processing system 718 can include instructions for, in response to determining that the I/O resources quota for the respective virtual disk is greater than a predetermined threshold and that the respective virtual disk is idle: updating the I/O resources quota for the respective virtual disk; and allocating to each I/O request an amount of the shared I/O resources based on the updated percentage of the I/O resources quota for the respective virtual disk (resource-scheduling module 726). Content-processing system 718 can include instructions for reducing by an amount the I/O resources quota for the respective virtual disk that is idle, and increasing by the amount the I/O resources quota for other virtual disks that are not idle (resource-scheduling module 726).

Data 730 can include any data that is required as input or that is generated as output by the methods and/or processes described in this disclosure. Specifically, data 730 can store at least: a packet or message that corresponds to an I/O request; an I/O operation that corresponds to an I/O request; a virtual machine; a virtual disk; a target virtual disk; an I/O queue; a mapping between an I/O queue and a virtual disk; a virtual disk identifier; a process identifier; an I/O feature; an I/O feature for an I/Q request; a scheduling parameter for a virtual disk; an I/O resources quota; an indicator of shared I/O resources; an allotted percentage of shared I/O resources for multiple virtual disks of a virtual machine; an amount of I/O resources quota to deduct for one virtual disk and reallocating to one or more other virtual disks; and a reallocation of shared I/O resources.

In summary, the system creates, in the kernel of the physical machine, an I/O queue for each virtual disk of the virtual machine. Each I/O queue corresponds to a subsequently received I/O request which is triggered by a user of the physical machine. For example, when an I/O request is involved in a read-write operation associated with a virtual disk, the system will assign the I/O request to the I/O queue that corresponds to the virtual disk. This allows the system to schedule the I/O resources based on the I/O resources quota corresponding to each virtual disk (i.e., each I/O queue). Thus, the system can balance and allocate the I/O resources among the multiple virtual disks of the virtual machine, which results in an improved Quality of Service (QoS) for the virtual machine.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for scheduling I/O resources of a virtual machine, the system comprising:
 a processor; and
 a memory coupled to the processor and storing instructions, which when executed by the processor cause the processor to perform a method, the method comprising:
  in response to receiving a plurality of I/O requests, identifying a plurality of target virtual disks to which the I/O requests are to be sent based on a feature included in a respective I/O request;
  assigning the respective I/O request to an I/O queue associated with a target virtual disk, which is the only target virtual disk corresponding to a single I/O thread for the respective I/O request, wherein the single I/O thread is not shared by any other target virtual disk; and
  scheduling I/O resources to be used by the respective I/O request by:
   obtaining, for the target virtual disk, a scheduling parameter which represents an I/O resources quota for the target virtual disk,
   wherein the I/O resources quota indicates an allotted percentage of shared I/O resources for the plurality of target virtual disks;
   allocating, to the respective I/O request, an amount of the shared I/O resources based on the allotted percentage indicated in the I/O resources quota for the target virtual disk; and
   processing, by the target virtual disk, the respective I/O request for the single I/O thread based on the allocated amount of the shared resources.

2. The computer system of claim 1, wherein the method further comprises:
 creating an I/O queue for each of a plurality of virtual disks of a virtual machine, wherein the plurality of virtual disks includes the plurality of target virtual disks, and wherein the virtual machine is associated with the computer system.

3. The computer system of claim 1, wherein in response to receiving the plurality of I/O requests, the method further comprises:
   initiating I/O operations for the plurality of target virtual disks.

4. The computer system of claim 1, wherein identifying the plurality of target virtual disks further comprises:
   obtaining the feature included in the respective I/O request, wherein the feature includes a virtual disk identifier and one or more of:
   a process identifier which indicates that a source of the respective I/O request is a virtual machine; and
   an indicator of a priority for the respective I/O request.

5. The computer system of claim 4, wherein in response to determining that the respective I/O request includes the process identifier, the method further comprises:
   identifying a target virtual disk that corresponds to the virtual disk identifier and is a virtual disk to be accessed by the respective I/O request.

6. The computer system of claim 1, wherein assigning the respective I/O request to the I/O queue associated with the target virtual disk further comprises:
   identifying the target virtual disk based on a virtual disk identifier included in the feature of the respective I/O request; and
   wherein assigning the respective I/O request to the I/O queue is based on a mapping between a previously created I/O queue and the target virtual disk.

7. The computer system of claim 2, wherein scheduling the I/O resources further comprises:
   obtaining, for each virtual disk of the virtual machine, a scheduling parameter that corresponds to a respective virtual disk, wherein the scheduling parameter represents an I/O resources quota for the respective virtual disk, wherein the I/O resources quota indicates an allotted percentage of shared I/O resources for the virtual disks; and
   allocating to each I/O request an amount of the shared I/O resources based on the allotted percentage indicated as the I/O resources quota for the respective virtual disk.

8. The computer system of claim 7, wherein the method further comprises:
   in response to determining that the I/O resources quota for the respective virtual disk is greater than a predetermined threshold and that the respective virtual disk is not idle:
   allocating to each I/O request an amount of the shared I/O resources based on the allotted percentage of the I/O resources quota for the respective virtual disk.

9. The computer system of claim 7, wherein the method further comprises:
   in response to determining that the I/O resources quota for the respective virtual disk is greater than a predetermined threshold and that the respective virtual disk is idle:
   updating the I/O resources quota for the respective virtual disk; and
   allocating to each I/O request an amount of the shared I/O resources based on the updated percentage of the I/O resources quota for the respective virtual disk.

10. The computer system of claim 9, wherein the method further comprises:
    reducing by an amount the I/O resources quota for the respective virtual disk that is idle; and
    increasing by the amount the I/O resources quota for other virtual disks that are not idle.

11. A computer-implemented method for scheduling I/O resources of a virtual machine, the method comprising:
    in response to receiving a plurality of I/O requests, identifying a plurality of target virtual disks to which the I/O requests are to be sent based on a feature included in a respective I/O request;
    assigning the respective I/O request to an I/O queue associated with a target virtual disk, which is the only target virtual disk corresponding to a single I/O thread for the respective I/O request, wherein the single I/O thread is not shared by any other target virtual disk; and
    scheduling I/O resources to be used by the respective I/O request by:
    obtaining, for the target virtual disk, a scheduling parameter which represents an I/O resources quota for the target virtual disk,
    wherein the I/O resources quota indicates an allotted percentage of shared I/O resources for the plurality of target virtual disks;
    allocating, to the respective I/O request, an amount of the shared I/O resources based on the allotted percentage indicated in the I/O resources quota for the target virtual disk; and
    processing, by the target virtual disk, the respective I/O request for the single I/O thread based on the allocated amount of the shared resources.

12. The method of claim 11, further comprising:
    creating an I/O queue for each of a plurality of virtual disks of a virtual machine, wherein the plurality of virtual disks includes the plurality of target virtual disks, and wherein the virtual machine is associated with the computer system.

13. The method of claim 11, wherein in response to receiving the plurality of I/O requests, the method further comprises:
    initiating I/O operations for the plurality of target virtual disks.

14. The method of claim 11, wherein identifying the plurality of target virtual disks further comprises:
    obtaining the feature included in the respective I/O request, wherein the feature includes a virtual disk identifier and one or more of:
    a process identifier which indicates that a source of the respective I/O request is a virtual machine; and
    an indicator of a priority for the respective I/O request.

15. The method of claim 14, wherein in response to determining that the respective I/O request includes the process identifier, the method further comprises:
    identifying a target virtual disk that corresponds to the virtual disk identifier and is a virtual disk to be accessed by the respective I/O request.

16. The method of claim 11, wherein assigning the respective I/O request to the I/O queue associated with the target virtual disk further comprises:
    identifying the target virtual disk based on a virtual disk identifier included in the feature of the respective I/O request; and
    wherein assigning the respective I/O request to the I/O queue is based on a mapping between a previously created I/O queue and the target virtual disk.

17. The method of claim 12, wherein scheduling the I/O resources further comprises:
    obtaining, for each virtual disk of the virtual machine, a scheduling parameter that corresponds to a respective virtual disk, wherein the scheduling parameter represents an I/O resources quota for the respective virtual disk, wherein the I/O resources quota indicates an allotted percentage of shared I/O resources for the virtual disks; and allocating to each I/O request an amount of the shared I/O resources based on the allotted percentage indicated as the I/O resources quota for the respective virtual disk.

18. The method of claim 17, further comprising:

in response to determining that the I/O resources quota for the respective virtual disk is greater than a predetermined threshold and that the respective virtual disk is not idle:

allocating to each I/O request an amount of the shared I/O resources based on the allotted percentage of the I/O resources quota for the respective virtual disk.

19. The method of claim 17, further comprising:

in response to determining that the I/O resources quota for the respective virtual disk is greater than a predetermined threshold and that the respective virtual disk is idle:

updating the I/O resources quota for the respective virtual disk; and    allocating to each I/O request an amount of the shared I/O resources based on the updated percentage of the I/O resources quota for the respective virtual disk.

20. The method of claim 19, further comprising:

reducing by an amount the I/O resources quota for the respective virtual disk that is idle; and increasing by the amount the I/O resources quota for other virtual disks that are not idle.

* * * * *